US012417257B2

(12) United States Patent
Gheewala et al.

(10) Patent No.: US 12,417,257 B2
(45) Date of Patent: Sep. 16, 2025

(54) METHOD OF DETERMINING AN INTERFACE HEIGHT OF AN INTERFACE BETWEEN AN UPPER AND A LOWER LAYER COMPRISED IN A THICKENER

(71) Applicant: Endress+Hauser Group Services AG, Reinach (CH)

(72) Inventors: Jenish Gheewala, Basel (CH); Dimitri Vaissiere, Rixheim (FR); Matthias Brenzinger, Staufen (DE); Dhiren Naidoo, Gauteng (CA); Taylor McKertich, Parramatta (AU); Nicolas Cadiz, Santiago (CL)

(73) Assignee: ENDRESS+HAUSER GROUP SERVICES AG, Reinach (CH)

( * ) Notice: Subject to any disclaimer, the term of this patent is extended or adjusted under 35 U.S.C. 154(b) by 922 days.

(21) Appl. No.: 17/625,924

(22) PCT Filed: Jun. 18, 2020

(86) PCT No.: PCT/EP2020/066934
§ 371 (c)(1),
(2) Date: Jan. 10, 2022

(87) PCT Pub. No.: WO2021/004748
PCT Pub. Date: Jan. 14, 2021

(65) Prior Publication Data
US 2022/0253646 A1 Aug. 11, 2022

(30) Foreign Application Priority Data
Jul. 8, 2019 (DE) ...................... 10 2019 118 413.4

(51) Int. Cl.
*G06F 18/214* (2023.01)
*G01F 23/28* (2006.01)
(Continued)

(52) U.S. Cl.
CPC ............ *G06F 18/214* (2023.01); *G01F 23/28* (2013.01); *G01F 23/80* (2022.01); *G06F 18/295* (2023.01)

(58) Field of Classification Search
CPC ...... G06F 18/214; G06F 18/295; G06F 9/451; G01F 23/28; G01F 23/80; G06N 3/044;
(Continued)

(56) References Cited

U.S. PATENT DOCUMENTS 4,226,714 A * 10/1980 Furness .................. B01D 21/06
210/744
6,814,874 B2 * 11/2004 Ruehrwein ........... C02F 1/5281
210/744
(Continued)

FOREIGN PATENT DOCUMENTS

CL   2019002129 A1   12/2019
CN   102749121 A1    10/2012
(Continued)

OTHER PUBLICATIONS

Acuña, et al., Online bed height and solids concentration sensor for thickeners based on conductivity and neural networks, Tailings 2014, 2nd International Seminar on Tailings Management, 10 pp.

*Primary Examiner* — Mohammad K Islam
(74) *Attorney, Agent, or Firm* — Brannon Sowers & Cracraft PC

(57) ABSTRACT

A method of determining an interface height in a container of a thickener includes measuring said interface height with a level measurement device during time periods, when conditions permit, measuring process variables related to the thickening process performed by the thickener and calculating and providing a calculated interface height, wherein a calculating unit is designed to learn said calculation based on said measured interface heights and said measured process variables.

16 Claims, 2 Drawing Sheets

(51) Int. Cl.
*G01F 23/80* (2022.01)
*G06F 18/20* (2023.01)

(58) Field of Classification Search
CPC . G06N 7/01; G06N 3/08; G06N 20/00; B01D 21/34; B01D 21/30; B01D 21/32; B01D 21/01; B01D 21/245; B01D 21/08; B01D 21/2427; B01D 21/2444; B01D 17/12; B01D 21/06; B01D 21/2405; B01D 17/0208; B01D 17/0214; B01D 21/0006; B01D 21/0012; B01D 21/0018; B01D 21/003; B01D 21/0045; B01D 21/0057; B01D 21/14; B01D 21/2433; B01D 21/2488; B01D 21/302; B01D 2201/265; B01D 2221/04; B01D 2221/06; B01D 2311/04; B01D 37/03; B01D 37/04; B01D 37/043
See application file for complete search history.

(56) References Cited

U.S. PATENT DOCUMENTS

| | | | |
|---|---|---|---|
| 9,855,518 B2 * | 1/2018 | Wright | B01D 21/0012 |
| 11,202,974 B2 * | 12/2021 | Bose | B01D 21/30 |
| 11,224,829 B2 * | 1/2022 | Kosonen | G05B 13/042 |
| 2003/0052061 A1 * | 3/2003 | Burke | C02F 1/24 210/703 |
| 2009/0158839 A1 * | 6/2009 | Spanke | G01S 13/88 73/290 V |
| 2009/0308815 A1 * | 12/2009 | Sauvignet | B01D 21/245 210/709 |
| 2011/0272346 A1 * | 11/2011 | Descamps | B01D 21/34 210/513 |
| 2012/0145653 A1 * | 6/2012 | Van Der Merwe | C10G 1/045 210/534 |
| 2013/0110420 A1 | 5/2013 | Griessbaum et al. | |
| 2013/0134078 A1 * | 5/2013 | Bias | B03D 1/1487 210/137 |
| 2013/0238145 A1 | 9/2013 | Hammer et al. | |
| 2018/0044159 A1 | 2/2018 | Crouse et al. | |
| 2019/0084853 A1 * | 3/2019 | Lindemann | G16H 10/40 |

FOREIGN PATENT DOCUMENTS

| | | |
|---|---|---|
| CN | 103940710 A | 7/2014 |
| CN | 104176800 A | 12/2014 |
| CN | 108490154 A | 9/2018 |
| CN | 108490154 A1 | 9/2018 |
| CN | 109357725 A | 2/2019 |
| JP | 2013238427 A | 11/2013 |
| WO | 2018137893 A1 | 8/2018 |

* cited by examiner

METHOD OF DETERMINING AN INTERFACE HEIGHT OF AN INTERFACE BETWEEN AN UPPER AND A LOWER LAYER COMPRISED IN A THICKENER

CROSS-REFERENCE TO RELATED APPLICATIONS

The present application is related to and claims the priority benefit of German Patent Application No. 10 2019 118 413.4, filed on Jul. 8, 2019, and International Patent Application No. PCT/EP2020/066934, filed on Jun. 18, 2020, the entire contents of which are incorporated herein by reference.

TECHNICAL FIELD

The invention concerns a method of determining an interface height of an interface between an upper layer and a lower layer comprised in a container of a thickener, wherein said thickener is designed to perform a thickening process, wherein particles suspended in a medium supplied to said container are separated from a liquid comprised in the medium, and wherein said upper layer comprises said liquid floating on said lower layer comprising said particles, said method comprising the method step of:
 measuring said interface height with an interface level measurement device installed on said thickener during time periods, when conditions prevailing at said thickener permit performance of these measurements.

BACKGROUND

Thickeners are applied in various industries to separate particles suspended in a medium, e.g. in a slurry, from a liquid comprised in the medium. They are e.g. applied in mineral refining processes.

State of the art thickeners designed to perform a thickening process usually comprise a container and a supply pipe supplying the medium to the container. Inside the container gravitation causes the solid particles comprised in the medium to gradually sink down to the bottom of the container. In consequence the medium separates into an upper layer comprising the liquid and a lower layer comprising a correspondingly higher concentration of particles. This separation allows for the liquid to be withdrawn from the container through an overflow outlet located at a height of a container wall exposed to the upper layer on the inside. Further, it allows for a sediment comprising a high concentration of particles at the bottom of the container to be discharged through an underflow outlet located at or near the bottom of the container. To this extent, thickeners are usually equipped with a rotating rake comprising scraper blades pushing the sediment towards a cone shaped discharge outlet located in the center of the bottom of the container.

It is known in the prior art, that a settling and compaction rate of the particles depends on the particle size of the particles and can be increased by adding chemical flocculants and/or coagulants to the medium.

Performance of the thickening process is usually monitored, regulated and/or controlled based on measurements of an interface height of an interface between the upper and the lower layer. Based on these measurements the interface height is preferably regulated and/or controlled by regulating and/or controlling the supply of the medium to container, the withdrawal of the liquid, and/or the discharge of the sediment. As an option, efficiency of the process can be further improved by regulating and/or controlling the supply of flocculants and/or coagulants based on the measured interface height.

The interface height can e.g. be measured by interface level measurement device capable of performing these measurements. As an example, level measurement devices sold by the Endress+Hauser group can be applied. One example are time of flight measurement devices measuring a time of flight required for a signal to travel to the interface and for its reflection reflected by the interface to return to the device. The measured time of flight depends on the signal propagation velocity and the distance travelled and thus allows for the interface height to be determined based on the position of the measurement device in relation to the container. Regardless of the type of interface level measurement device applied, interface height measurements can only be performed during times when the measurement conditions prevailing at the thickener permit the performance of these measurements. As an example time of flight measurements of the interface height require a minimum reflectivity of the interface as well as a sufficiently high signal amplitude of the received signal. In addition, reflections caused by reflectors positioned along the signal propagation path to and from the interface may reduce the amplitude of the signal component of the received signal resulting from the reflection at the interface. Thus, it depends on the measurement conditions prevailing at the thickener, whether this signal component required to determine the interface height can be identified in the received signal.

These problems can be solved to a certain extent by using special types of signals, as well as by signal processing methods, like e.g. methods improving the signal-to-noise ratio, interface-height tracking methods, as well as advanced methods of identifying the signal component of the received signal caused by the reflection at the interface. Nonetheless, there remains a risk, that measurements of the present interface height may sometimes not be possible, in particular due to the rough and/or changing conditions prevailing at thickeners and/or their effect on the condition of the interface. Since the interface height constitutes a key parameter for monitoring, regulating and/or controlling the thickening process non-availability of the determination of the present interface height may reduce the quality and/or the efficiency of the thickening process.

SUMMARY

Thus, it is an object of the invention to improve the availability of the determination of the interface height.

This object is achieved by a method, in particular a computer implemented method, of determining an interface height of an interface between an upper layer and a lower layer comprised in a container of a thickener, wherein said thickener is designed to perform a thickening process, wherein particles suspended in a medium supplied to said container are separated from a liquid comprised in the medium, and wherein said upper layer comprises said liquid floating on said lower layer comprising said particles, said method comprising the method step of:
 measuring said interface height with an interface level measurement device installed on said thickener during time periods, when conditions prevailing at said thickener permit performance of these measurements,
 with a group of measurement devices installed on said thickener measuring process variables related to the thickening process performed by the thickener, and at least once calculating and providing a calculated interface height with a calculating unit based on said measured process variables provided to said calculating unit, wherein said calculating unit is designed to learn said calculation of said calculated interface height based on said measured interface heights and said measured process variables measured during at least one of said time periods and provided by said interface level measurement device and said measurement devices.

It is an advantage of the method, that once the calculation has been learned calculated interface height(s) can be determined at any time regardless of whether the interface height can be measured by the interface level measurement device or not. Thus based on the invention, the interface height can be determined during the time periods when the conditions prevailing at the thickener do not permit for the interface height to be measured.

A first refinement of the method comprises a method according to the invention, wherein:

said learning of said calculation of said at least one calculated interface height is performed by said calculation unit performing a learning process based on training data determined as or based on said measured interface heights and said measured process variables measured and provided by said interface level measurement device and said group of measurement devices during at least one of said time periods, and only measured interface heights and measured process variables measured during one or more time intervals, during which the measured interface heights are reliable are used as training data or to determine said training data.

According to a second refinement reliability or unreliability of said measured interface heights is determined by at least one of:

a) monitoring said measured interface heights, b) determining a rate of change of said interface height as a function of time based on said measured interface heights and based on said rate of change determining measured interface heights determined during time intervals during which the rate of change exceeds a predetermined threshold or a threshold given by a maximum speed of the interface height to be expected during performance of the thickening process as being unreliable, c) determining measured interface heights exceeding a predetermined height range or a height range given by a range of interface heights to be expected during normal performance of the thickening process as being unreliable, d) monitoring a signal to noise ratio of a measurement signal obtained by said interface level measurement device and identifying measured interface heights determined based on measurement signals having a signal to noise ratio smaller than a predetermined threshold as unreliable, e) applying a filter to said measured interface heights, based on said measured interface heights and said filtered interface heights determining a noise superimposed on said filtered interface heights and identifying measured interface heights measured at times when said noise exceeded a predetermined threshold as unreliable, f) performing reference measurements of said interface height and identifying measured interface heights deviating from the corresponding reference measurements by more than a predetermined threshold as unreliable, g) determining at least one of: at least one physical model for estimating said interface height based on at least one of said measured process variables and a statistical model for estimating said interface height based on at least one of said measured process variables, and based on estimated interface heights determined based on at least one of said models performing at least one of:

g1) identifying measured interface heights deviating from the corresponding estimated interface height by more than a predetermined threshold or a threshold determined based on an uncertainty inherent to the estimation as being unreliable, g2) identifying unreliable measured interface heights comprised in training data determined for learning said calculation of said calculated interface heights and eliminating said identified measured unreliable interface heights from said training data, and g3) providing a notification informing about unreliable measured interface heights identified based on said estimated interface heights, and h) performing at least one other method capable of determining the reliability or the unreliability of the measured interface heights.

According to a third refinement, the method according to the invention further comprises at least one of the method steps of:

a) determining training data for learning said calculation of said calculated interface heights by additionally performing an outlier detection or an outlier detection implemented as part of a machine learning process, based on this outlier detection identifying outliers comprised in said training data and eliminating said identified outliers from said training data applied to learn said calculation, and b) based on at least one of said measured process variables or based on said measured interface heights and at least one or all of said measured process variables numerically determining values of at least one of said process variables, wherein: said numerically determined values comprise at least one of: at least one numerically determined value determined by interpolation, at least one numerically determined value determined by simulation and at least one numerically determined value determined by a Monte Carlo simulation, and performing at least one of:

applying numerically determined values determined for times comprised in at least one of said time periods or time intervals during which said measured interface heights and said measured process variables applied to determine training data for learning said calculation of said calculated interface heights were measured as additional training data, and applying numerically determined values determined for times occurring after the learning of said calculation of said calculated interface heights has been completed in addition to said measured process variables to calculate said calculated interface heights.

According to a fourth refinement, the method according to the invention comprises the method steps of:

determining at least one secondary variable or at least one secondary variable directly or indirectly related to said interface height as a function of at least one of: said measured interface height and at least one or all of said measured process variables, and performing at least one of:

a) using said secondary variables determined for times comprised in at least one of said time periods or time intervals during which said measured interface heights and said measured process variables applied to determine training data for learning said calculation of said calculated interface heights were measured as additional training data, and b) applying said secondary variables determined for times occurring after said learning of said calculation of said calculated interface heights has been completed in addition to said measured process variables to calculate said calculated interface heights.

According to a fifth refinement, the method according to the invention comprises the method steps of for at least one of said process variables performing at least one of the method steps of:

at least once calculating and providing a calculated value of said process variable, and detecting and indication a problem regarding the measurement device measuring said process variable when a deviation between said measured process variable measured by said measurement device and the corresponding calculated value exceeds a predetermined threshold or a threshold determined based on an uncertainty inherent to said calculation, wherein said calculated values of said process variables comprise at least one of:

a) at least one calculated value determined based on a physical model or a statistical model for estimating the respective process variable based on some or all of the other process variables measured by said measurement devices or based on the measured interface height and some or all of the other process variables measured by said measurement devices, and b) at least one calculated value calculated by said calculation unit, wherein:

b1) said calculation unit is designed to learn said calculation of calculated values of said process variable based on said measured process variables or based on said measured process variables and said measured interface heights, and b2) each of said calculated values of the respective process variable is calculated based on some or all of the other process variables measured and provided by said measurement devices or based on the measured interface heights and on some or all of the other process variables measured and provided by said measurement devices.

The invention further comprises a sixth refinement, wherein at least one of: said measured interface heights, at least one of said measured process variables and some or all of said training data is provided to said calculation unit by at least one of:

a) said interface level measurement device and at least one of said measurement devices comprised in said group;

b) a super-ordinated unit connected to and/or communicating with at least one or all of: said interface level measurement device and at least one of said measurement devices comprised in said group, and c) an edge device connected to and/or communicating with at least one or all of: said interface level measurement device and at least one of said measurement devices comprised in said group.

According to a seventh refinement, said process variables and said interface height are correlated.

An eights refinement comprises the method according to the invention, wherein said group of measurement device measuring and providing said process variables comprise at least one of:

a flow meter installed in or on a supply pipe supplying said medium to said container, said flow meter measuring a flow of said medium supplied to said container, a flow meter installed in or on an overflow outlet pipe and measuring a flow of said liquid withdrawn from said container through said overflow outlet pipe, and a flow meter installed in or on an underflow outlet pipe connected to an underflow outlet located at or near a bottom of the container, said flow meter measuring a flow of a sediment discharged from said container through said underflow outlet pipe, a flow meter installed in or on a supply line supplying a product, namely a product comprising at least one of: a flocculant and a coagulant, supplied to said container, said flow meter measuring a flow of the product supplied to said container through said supply line, a density measurement device measuring a density of a sediment located at or near a bottom of the container, a density measurement device installed in or on said underflow outlet pipe and measuring a density of said sediment discharged from said container through said underflow outlet pipe, a pressure measurement device measuring a hydrostatic pressure prevailing at a predetermined height inside said container or at or near said bottom of said container, a torque measurement device measuring a torque exerted by a motor to rotate a rake installed on said thickener around a longitudinal axis of rotation, wherein said rake is a rake for pushing said sediment towards an underflow outlet located at a bottom of said container, a height measurement device measuring an insertion height of said rake in relation to a predetermined reference height, a turbidity measurement device installed in or on said overflow outlet pipe measuring a turbidity of said liquid withdrawn from said container through said overflow outlet pipe, and at least one other measurement device measuring at least one other process variable.

According to a ninth refinement, the method further comprises the method steps of during at least one time interval, during which measured interface heights measured by said interface level measurement device are unavailable or unreliable:

calculating calculated interface heights based on said measured process variables, and performing a least one of: providing said calculated interface heights and performing at least one of: monitoring, regulating and controlling said thickening process performed on said thickener based on said calculated interface heights.

According to a tenth refinement, the method according to the invention comprises the method steps of: during at least one or all of said time periods, during which said measurements of said interface height are permitted and performed by said interface level measurement device:

determining said calculated interface heights, and performing at least one of: providing said calculated interface heights and performing at least one of: monitoring, regulating and controlling said thickening process performed on said thickener based on at least one of: said measured interface heights, said calculated interface heights and an average of said measured and said calculated interface heights.

According to an eleventh refinement, the method according to the invention comprises the method steps of: during at least one or all of said time periods, during which said measurements of said interface height are permitted and performed by said interface level measurement device, determining said calculated interface heights and performing at least one of:

monitoring said interface level measurement device and said calculation unit based on said measured and said calculated interface heights, detecting a fault when a deviation between one of said measured interface heights and the corresponding calculated interface height exceeds a predetermined threshold, and when a fault is detected providing a notification informing about this fault.

According to a twelfth refinement, the method according to the invention comprises the method steps of at least once:

providing one of said calculated interface heights as a reference height for an interface height measurement, based on said reference height determining a limited measurement range comprising said reference height for said interface level measurement device, and performing a measurement of said interface height with said interface level measurement device within this limited measurement range, wherein said limited height range is determined as a fraction of a full measurement range of said interface level measurement device or is determined as a range comprising interface heights deviating from said the reference height by less than a predetermined percentage, by less than 10% or by less than 5% of a width of said full measurement range.

A further refinement is given by a refinement of the twelfth refinement, wherein said interface level measurement device:

is a time of flight measurement device determining said measured interface heights based on a time of flight required for a signal to travel to said interface and for its reflection to return, and comprises a signal processing and evaluation unit determining an echo function representing a signal amplitude of the echo signal as a function of the time of flight, identifying a maximum of said echo function caused by said reflection at said interface and determining the measured interface height based on the time of flight at which this maximum occurs, and wherein said measurement of said interface height performed within said limited measurement range is performed by at least one of:

excluding all amplitude peaks comprised in said echo function occurring outside said limited measurement range, determining said maximum corresponding to said reflection at said interface as a maximum of a first amplitude peak or an amplitude peak having the highest peak amplitude comprised in said echo function within said limited measurement range, and performing a method of identifying said maximum of said echo function caused by said reflection at said interface within said limited measurement range.

The invention further comprises a computer program for determining an interface height of an interface between an upper layer and a lower layer comprised in a container of a thickener according to the method according to the invention, in particular for determining at least one calculated interface height according to the method according to the invention, comprising instructions which, when the program is executed by a computer, cause the computer to carry out the method according to the claimed invention.

It further comprises a refinement of the computer program, wherein said instruction comprise instructions which, when the program is executed by a computer, cause said computer to perform said learning of said calculation based on said measured interface heights and said measured process variables and to perform said calculation of said at least one calculated interface height based on said learned calculation and said measured process variables.

The invention further comprises a computer program product comprising said computer program according to the invention and at least one computer readable medium, wherein at least said computer program is stored on said computer readable medium.

BRIEF DESCRIPTION OF THE DRAWINGS

The invention and further advantages are explained in more detail using the figures of the drawing.

DETAILED DESCRIPTION

Figure 1:
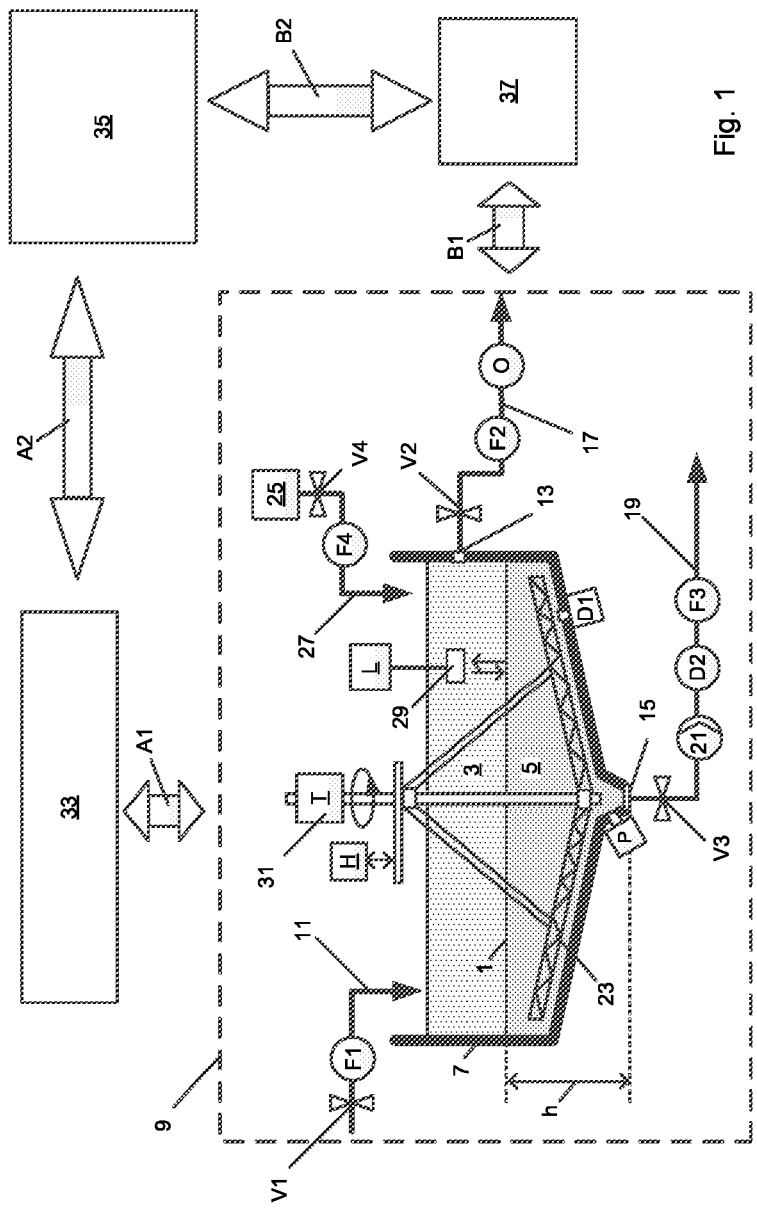
FIG. 1 shows a system for determining an interface height.

The invention provides a method of determining an interface height h of an interface 1 between an upper layer 3 and a lower layer 5 comprised in a container 7 of a thickener 9. FIG. 1 shows an example of a system for performing this method. The thickener 9 is designed to perform a thickening process, wherein particles suspended in a medium supplied to the thickener 9 are separated from a liquid comprised in the medium. In the example shown, the thickener 9 comprises a supply pipe 11 supplying the medium to the container 7. The supply of the medium can e.g. be regulated and/or controlled by a valve V1 inserted in the supply pipe 11. Inside the container 7 gravitation causes the solid particles comprised in the medium to gradually sink down to the bottom of the container 7. In consequence the medium separates into the upper layer 3 comprising the liquid floating on the lower layer 5 comprising the particles. Typically a concentration of particles comprised in the lower layer increases towards the bottom of the container 7 and causes the lower layer to comprise a sediment having the highest concentration of particles at or near the bottom.

The thickener 9 comprises an overflow outlet 13 and an underflow outlet 15. The overflow outlet 13 is located at a height of a container wall of the container 7, which is exposed to the upper layer 3 on the inside during performance of the thickening process and thus allows for the liquid to be withdrawn from the container 7. Withdrawal of the liquid can e.g. be regulated and/or controlled by a valve V2 inserted in an overflow outlet pipe 17 connected to the overflow outlet 13. The underflow outlet 15 is located at or near the bottom of the container 7 and thus allows for the sediment settling at the bottom of the container 7 to be discharged. Discharge of the sediment can e.g. be regulated and/or controlled by a valve V3 inserted in an underflow outlet pipe 19 connected to the underflow outlet 15. As an option, a discharge rate at which the sediment can be discharged can be increased by a pump 21 inserted into the underflow outlet pipe 19.

As an optional feature, the thickener 9 is preferably equipped with a rotating rake 23, e.g. a rake 23 comprising scraper blades, pushing the sediment towards the underflow outlet 15. In this case, the underflow outlet 15 is preferably cone shaped and located in the center of the bottom of the container 7.

As a further optional feature, the thickener 9 may comprise supply means for supplying a product, namely a product comprising a flocculant and/or a coagulant, to the container 7. As shown in FIG. 1, the supply means can e.g. comprise a reservoir 25 comprising the product and a supply line 27 extending from the reservoir 25 to the container 7. The product supply provided by the supply means can e.g. be regulated and/or controlled by a valve V4 inserted in the supply line 27.

The thickener 9 is equipped with an interface level measurement device L designed to measure the interface height h of the interface 1 between the upper layer 3 and the lower layer 5. To this extent interface level measurement devices known in the art can be applied. As an example, the interface level measurement device L can e.g. be a time of flight measurement device determining the interface height h based on a time of flight required for a signal to travel to the interface 1 and for its reflection to return.

FIG. 1 shows an example of an ultrasonic time of flight measurement device comprising a transducer 29 transmitting ultrasonic signals, e.g. pulses, towards the interface 1 and receiving an echo signal comprising reflections of the transmitted signal reflected back to the transducer 29. Just like time of flight measurement devices known in the art, the interface level measurement device L preferably comprises a signal processing and evaluation unit determining an echo function A(tof) representing a signal amplitude A of the echo signal as a function of the time of flight tof, identifying a maximum $E_L$ of the echo function A(tof) caused by the reflection at the interface 1 and determining the interface height h based on the time of flight $t_{EL}$ at which this maximum $E_L$ occurs.

Figure 2:
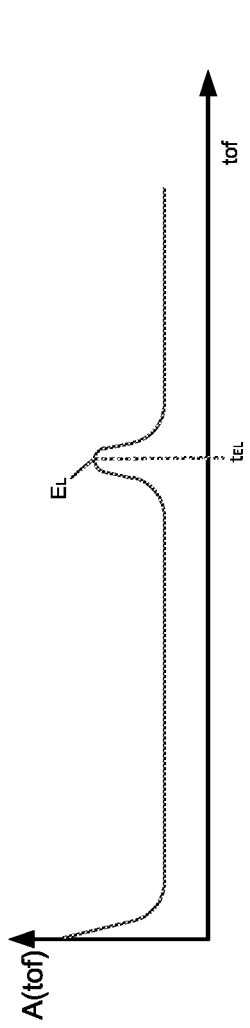
FIG. 2 shows an echo function determined by a time of flight interface level measurement device during ideal measurement conditions.

FIG. 2 shows a very simplified example of an echo function A(tof) comprising a distinct maximum $E_L$ at the time of flight $t_{EL}$. This time of flight $t_{EL}$ corresponds to the distance between the transducer 29 and the interface 1 and can thus be transformed into the measured interface height $h_m$ based on the signal propagation velocity and the position of the transducer 29 in relation to the container 7. Obviously other types of time of flight level measurement devices or interface level measurement devices operating based on other measurement principles, like e.g. devices comprising a capacitance probe measuring a capacity of a capacitor formed by the probe and the container wall, or radiometric level measurement devices can be applied instead.

In addition, a group of measurement devices is installed on the thickener 9. Each of these measurement devices measures one or more process variables $v_1, \ldots, v_n$ related to the thickening process performed on the thickener 9. Thus, in combination the group of measurement devices measures and provides a set of measured process variables $v_1, \ldots, v_n$ comprising the individual process variables $v_1, \ldots, v_n$ measured by each of the devices. The group of measurement devices preferably comprises at least two or all measurement devices installed on the thickener 9 in addition to the interface level measurement device L, e.g. for the purpose of monitoring, regulating and/or to controlling the thickening process. This has the advantage, that the corresponding measured process variables $v_1, \ldots, v_n$ are available at no extra costs.

As shown in the example shown in FIG. 1, the group of measurement device can e.g. comprise at least one of:
- a flow meter F1 installed in or on the supply pipe 11 measuring a flow of the medium supplied to the container 7,
- a flow meter F2 installed in or on the overflow outlet pipe 17 measuring a flow of the liquid withdrawn from the container 7 through the overflow outlet pipe 17, and
- a flow meter F3 installed in or on the underflow outlet pipe 19 measuring a flow of the sediment discharged from the container 7 through the underflow outlet pipe 19, These devices are usually required anyway, to perform the thickening process.

As an additional or alternative option, the group of measurement device can e.g. comprise at least one of:
- a flow meter F4 installed in or on the supply line 27 measuring a flow of the product supplied to the container 7 through the supply line 27,
- a density measurement device D1 measuring a density of the sediment at or near the bottom of the container 7,
- a density measurement device D2 installed in or on the underflow outlet pipe 19 measuring a density of the sediment discharged from the container 7 through the underflow outlet pipe 19,
- a pressure measurement device P measuring a hydrostatic pressure prevailing at a predetermined height inside the container 7 or at or near the bottom of the container 7,
- a torque measurement device T measuring a torque exerted by a motor 31 to rotate the rake 23 around a longitudinal axis of rotation, and
- a height measurement device H measuring an insertion height of the rake 23 in relation to a predetermined reference height,
- a turbidity measurement device O installed in or on the overflow outlet pipe 17 measuring a turbidity of the liquid withdrawn from the container 7 through the overflow outlet pipe 17, and
- at least one other measurement device measuring at least one other process variable.

As an option the interface level measurement device L and/or at least one or all measurement devices of the group can be connected to and/or communicate with a super-ordinated unit 33. To this extent hard wired or wireless connections and/or communication protocols known in the art, like e.g. LAN, W-LAN, Fieldbus, Profibus, Hart, Bluetooth, Near Field Communications etc. can be applied. As an example, the super-ordinated unit 33 can e.g. comprise a control system performing at least one of: managing process control, process visualization and process monitoring of the thickening process performed by the thickener 9.

During performance of the method of determining the interface height h, the group of measurement devices measures and provides the measured process variables $v_1, \ldots, v_n$. In addition, the interface level measurement device L measures and provides the measured interface height $h_m$ during time periods, during which the conditions prevailing at the thickener 9 permit the performance of these measurements. These time periods, are obviously limited to time intervals during which measured interface heights $h_m$ are available, because they can be and are measured and provided by the interface level measurement device L.

Depending on the application and/or the type of the respective measurement device the measurements of the interface height h, and/or the process variables $v_1, \ldots, v_n$ can e.g. each be performed continuously, periodically or intermittedly by the respective device. Thus, the measurements of at least two or all of: the interface height h and the process variables $v_1, \ldots, v_n$ may be performed simultaneously or at different measurement times t.

Further, the measured interface heights $h_m$, the measured process variables $v_1, \ldots, v_n$ and the corresponding measurement times t are provided to a calculating unit 35. The calculating unit 35 is designed to learn the calculation of calculated interface heights $h_c$, wherein each calculated interface height $h_c$ is calculated based on the measured process variables $v_1, \ldots, v_n$ provided to the calculation unit 35. The learning is performed based on the measured interface height $h_m$ and the measured process variables $v_1, \ldots, v_n$, measured and provided to the calculating unit 35, which were measured during at least one of the time periods, during which the measurements of the interface height h were permitted. The learning process is preferably performed by the calculation unit 35 based on training data determined based on the measured interface heights $h_m$ and the measured process variables $v_1, \ldots, v_n$ obtained by the corresponding measurements performed during at least one of these time periods.

Preferably only measured interface heights $h_m$ and measured process variables $v_1, \ldots, v_n$ measured during one or more time intervals, during which the measured interface heights $h_m$ are not only available but also reliable are used as training data or to determine the training data. These time intervals are preferably identified by performing at least one method capable of determining the reliability or unreliability of the measured interface heights $h_m$.

Reliability or unreliability of the measured interface heights $h_m$ can e.g. be determined by monitoring the measured interface heights $h_m$. As an example, a rate of change of the interface height h is preferably determined as a function of time based on the measured interface heights $h_m$. Based on this rate of change, measured interface heights $h_m$ measured during time intervals during which the rate of change exceeds a predetermined threshold, e.g. a threshold given by a maximum speed of the interface height h to be expected during normal performance of the thickening process, are determined as being unreliable. As an additional or alternative option, measured interface heights $h_m$ exceeding a predetermined height range, e.g. a range given by a range of interface heights h to be expected during normal performance of the thickening process, are preferably also determined as being unreliable.

As an additional or alternative option, a signal to noise ratio of a measurement signal obtained by the interface level measurement device L can be monitored. In this case, measured interface heights $h_m$ determined based on measurement signals having a signal to noise ratio smaller than a predetermined threshold are identified as unreliable.

As an additional or alternative option, a filter is applied to the measured interface heights $h_m$ and a noise superimposed on the filtered interface heights $h_m$ is determined based on the measured interface heights $h_m$ and the filtered interface heights. In this case, measured interface heights $h_m$ measured at times when the noise exceeded a predetermined threshold are identified as unreliable.

As an additional or alternative option, reference measurements of the interface height can be performed. In this case, measured interface heights $h_m$ deviating from the corresponding reference measurements by more than a predetermined threshold are identified as unreliable. These reference measurements can e.g. be performed by an additional interface level measurement device installed on the thickener. As an option, this additional interface level measurement device can be removed once sufficient training data has been determined.

In addition or alternatively, at least one other method capable of determining the reliability or the unreliability of the measured interface heights $h_m$ can be applied.

The measured interface heights $h_m$ and/or at least one of the measured process variables $v_1, \ldots, v_n$ can be provided to the calculating unit 35 directly by the interface level measurement device L and/or the respective measurement device. As an alternative presently preferred option, at least one of: the measured interface heights $h_m$, at least one of the measured process variables $v_1, \ldots, v_n$, and at least some or all of the training data determined based on at least one of: the measured interface heights $h_m$ and at least one or all of the measured process variables $v_1, \ldots, v_n$ is provided to the calculation unit 35 by the super-ordinated unit 33 and/or by an edge device 37 connected to and/or communicating with at least one or all of: the interface level measurement device L and at least one or all of the measurement devices of the group measuring the process variables $v_1, \ldots, v_n$ as indicated by the arrows A1 and A2, and/or B1 and B2 respectively.

As an example, the training data can e.g. be provided to the calculation unit 35 in form of time series, e.g. time series of measurement results of the individual devices and/or in form of one or more time series each comprising measurement results simultaneously derived by at least two of the devices.

The calculation unit 35 can e.g. be embodied as a unit comprising hardware, like e.g. a computer or a computing system, located in the vicinity of the thickener 9 or at a remote location. As an alternative option cloud computing can be applied. Cloud computing denominates an approach, wherein IT-infrastructure, like hardware, computing power, memory, network capacity and/or software are provided via a network, e.g. via the internet. In that case, the calculation unit 35 is embodied in the cloud and connected to the super-ordinated unit 33, the edge device 37 and/or at least one or all of: the interface level measurement device L and at least one of the measurement devices comprised in the group via the internet, e.g. via a communication network, like e.g. TCP/IP. The method step of learning the calculation of calculated interface heights $h_c$ is based on the recognition provided by the present invention, that the process variables $v_1, \ldots, v_n$ and the interface height h are correlated and thus exhibit a deterministic behavior representative of the state of the thickener 9, allowing for the performance of this learning process.

As an example the flow of the medium supplied to the container 7 causes the interface height h to change corresponding to a separation rate achieved by the thickener 9, the flow of liquid withdrawn from the container 7 and the flow of sediment discharged from the container 7. Further, the hydrostatic pressure at the bottom of the container 7 corresponds to the total filling level given by the sum of the thickness of the upper layer 3 and the thickness of the lower layer 5 extending above the pressure measurement device P and their average density in a direction parallel to the direction of gravity. Thus, the hydrostatic pressure is indirectly related to the separation rate achieved by the thickener 9, the flow of liquid withdrawn from container 7 and the flow of sediment discharged from container 7 and thus also related to the interface height h. Further a change of the insertion height of the rake 23 and/or the torque required to rotate the rake 23 at a certain speed depends on the thickness and the density of the lower layer 5 and/or the sediment, which is indicative of the separation rate achieved by the thickener and thus also correlated to the interface height h. The turbidity of the liquid is indicative of the degree of separation achieved by the thickening process, which is at least indirectly related to the interface height h.

The calculating unit 35 is preferably equipped with artificial intelligence performing the learning process. The learning process can e.g. be a supervised learning process, wherein the behavior of the interface height h is learned based on the training data comprising output values given by the measured interface heights $h_m$ and corresponding input values given by the measured process variables $v_1, \ldots, v_n$. In this case, the learning process preferably provides a learned model representing the interdependency between the input values and the output values. Examples for supervised learning processes are so-called Recurrent Neural Networks (RNN) with Long Short Term Memory (LSTM), which are particularly well suited for time series. The invention is however neither limited to supervised learning nor to neural networks. Other techniques and/or methods of machine learning, like e.g. methods of determining deterministic models, methods applying robust covariances and/or methods applying Monte Carlo simulations, can be used instead of, in addition to or in combination with supervised learning and/or neural networks.

As an option, the determination of the training data may additionally comprise a method step of performing an outlier detection. Outlier detection can e.g. be implemented as part of the machine learning process. Based on this outlier detection outliers comprised in the training data are identified and subsequently eliminated from the training data applied to learn the calculation.

Regardless of the type of learning process applied a model for calculating the calculated interface height $h_c$ based on the measured process variables $v_1, \ldots, v_n$ is preferably determined based on the training data and stored in the calculation unit 35.

As an example, the calculation unit 35 can e.g. comprise or be part of a soft-sensor determining calculated interface heights $h_c$ and/or an adaptive or self-learning mathematical model. In principle, a soft-sensor is a virtual sensor for determining the interface height h, which does not measure the interface height h directly, but calculates calculated interface heights $h_c$ based on the input, in the present case the measured process variables $v_1, \ldots, v_n$ provided to it. In combination with artificial intelligence this has the advantage, that interrelations, in particular dynamic interrelations, between the interface height h and the dynamic behavior of the thickening process, in particular the dynamic behavior of the measured process variables $v_1, \ldots, v_n$ comprised in the training data and/or the measured process variables $v_1, \ldots, v_n$ applied to calculate the calculated interface heights $v_c$ can be accounted for.

Based on the learned calculation, in particular the learned model, learned by the calculation unit 35, at least one calculated value $h_c$ of the interface height h is calculated and provided by the calculation unit 35 based on measured process variables $v_1, \ldots, v_n$ supplied to the calculation unit 35 after the learning process has been performed.

The method according to the invention is preferably performed as a computer implemented method. In that case, the method steps described above, in particular the method steps performed by the calculating unit 35, are performed by means of a computer program for determining the interface height, in particular a computer program for determining at least one calculated interface height $h_c$ according to the method described above. Thus the invention is also realized in form of a computer program comprising instructions which, when the program is executed by a computer, cause the computer to carry out the method according to the invention as described above. In particular, these instructions comprise instructions which, when the program is executed by a computer, cause the computer to perform the learning of the calculation based on the measured interface heights $h_m$ and the measured process variables $v_1, \ldots, v_n$ and to perform the calculation of the at least one calculated interface height $h_c$ based on the learned calculation and the measured process variables $v_1, \ldots, v_n$. In addition, the invention further comprises a computer program product comprising the computer program described above and at least one computer readable medium, wherein at least the computer program is stored on the computer readable medium.

The method, the computer program and the computer program product each comprise the advantages mentioned above.

As mentioned above, the method described above, in particular the learning process, is performed based on training data determined based on the measured interface heights $h_m$ and measured process variables $v_1, \ldots, v_n$ measured during one or more time periods during which measured interface heights $h_m$ are measured and provided by the interface level measurement device L. This training data is preferably limited to only comprise data determined based on measured interface heights $h_m$ and measured process variables $v_1, \ldots, v_n$ measured during one or more time intervals, during which the measured interface heights $h_m$ are not only available but also reliable.

The training data preferably comprises the measured interface heights $h_m$ and the corresponding measured process variables $v_1, \ldots, v_n$ measured during the respective time periods or time intervals and the corresponding measurement times t.

As an option, numerically determined values $v_{1k}, \ldots, v_{nk}$ of at least one of the process variables $v_1, \ldots, v_n$ measured by the measurement devices can be determined, e.g. determined by the calculating unit 35 and/or determined and provided to the calculating unit 35 by the super-ordinated unit 33 and/or the edge device 37. These numerically determined values $v_{1k}, \ldots, v_{nk}$ preferably comprise interpolated and/or simulated values $v_{1k}, \ldots, v_{nk}$ of the respective process variable $v_n$ numerically determined by interpolation or by simulation, e.g. by means of a Monte Carlo simulation, performed based on at least one of the measured process variables $v_1, \ldots, v_n$ or performed based on the measured interface heights $h_m$ and at least one or all of the measured process variables $v_1, \ldots, v_n$. These numerically determined values $v_{1k}, \ldots, v_{nk}$ are preferably determined for times included in the time periods or time intervals during which the measured interface heights $h_m$ and the measured process variables $v_1, \ldots, v_n$ applied to determine the training data were measured. In this case they are used as additional training data for learning the calculation of the calculated interface heights $h_c$ applied in addition to the measured process variables $v_1, \ldots, v_n$. As an option, they can also be determined for times occurring after the learning process has been completed and applied in addition to the measured process variables $v_1, \ldots, v_n$ to calculate the calculated interface heights $h_c$.

As a further option, at least one secondary variable $v_s$ may be determined as a function of at least one of: the measured interface height $h_m$ and at least one or all of the measured process variables $v_1, \ldots, v_n$. The secondary variables $v_s$ preferably comprise at least one secondary variable $v_s$ directly or indirectly related to the interface height h. As an example, the secondary variables $v_s$ may comprise a ratio or a function of a ratio given by the flow of the product supplied to the container 7 divided by flow of the medium supplied to the container 7 and/or a mass balance or a function of a mass balance determined based on the difference between the mass flow of the medium entering the container 7 and the sum of the mass flows of the liquid and the sediment exciting the container 7. In this case, secondary variables $v_s$ determined for times comprised in the time periods or time intervals during which the measured interface heights $h_m$ and the measured process variables $v_1, \ldots, v_n$ applied to determine the training data were measured are preferably used as additional training data applied in addition to the measured process variables $v_1, \ldots, v_n$ to learn the calculation of the calculated interface heights $h_c$. As an option, they can also be determined for times occurring after the learning process has been completed and applied in addition to the measured process variables $v_1, \ldots, v_n$ to calculate the calculated interface heights $h_c$. In both cases they can e.g. be treated as additional process variables applied in the same way as the measured process variables $v_1, \ldots, v_n$.

As a further option at least one physical model and/or a statistical model for estimating the interface height h based on at least one of the measured process variables $v_1, \ldots, v_n$ can be determined. These models are preferably determined based on data comprised in a limited fraction of the training data. The physical models preferably comprise at least one model determined based on a known physical dependency of the interface height h on the respective process variable(s), like e.g. a dependency of the interface height h on the mass balance of the supplied medium, the withdrawn liquid and the discharged sediment. In addition or as an alternative, they preferably comprise at least one model determined by determining correlations between the measured interface heights $h_m$ and at least one of the measured process variables $v_1, \ldots, v_n$. Statistical models are preferably determined based on a statistical analysis of the data. The estimated interface heights determined based on at least one of these models are preferably applied to monitor the measured interface heights $h_m$. In addition or as an alternative, measured interface heights $h_m$ deviating from the corresponding estimated interface height determined based on the respective model by more than a predetermined threshold, e.g. a threshold determined based on the uncertainty inherent to the estimation, are preferably identified as being unreliable. Based on this, unreliable measured interface heights $h_m$ comprised in the training data are preferably identified and subsequently eliminated from the training data applied to learn the calculation. As a further option, unreliable measured interface heights $h_m$, in particular unreliable measured interface heights $h_m$ measured after the performance of the learning process, are preferably identified based on the corresponding estimated interface heights and a corresponding notification informing about the identified unreliable measured interface height(s) $h_m$ is preferably provided.

The calculated interface heights $h_c$ calculated and provided by the method described above can be applied in various different ways. As one option, calculated interface heights $h_c$ are preferably calculated and provided during at least one time interval, during which measured interface heights $h_m$ are unavailable or unreliable. These calculated interface heights $h_c$ are preferably applied to monitor, regulate and/or control the thickening process performed on the thickener 9. To this extent, the calculated interface heights $h_c$ are preferably provided to the super-ordinated unit 33 performing the monitoring, regulating and/or controlling of the thickening process based on these calculated interface heights $h_c$.

As an additional or alternative option, calculated interface heights $h_c$ are preferably also calculated and provided during at least one or all of the time periods during which the measurements of the interface height h are permitted. During these time periods measured interface heights $h_m$ are measured provided by the interface level measurement device L. This allows for the monitoring, regulation and/or controlling of the thickening process to be performed based on the measured interface heights $h_m$ and/or the calculated interface height $h_c$ during these time periods. In this case, the measured and/or the calculated interface heights $h_m$, $h_c$ are preferably provided to the super-ordinated unit 33 performing the monitoring, regulating and/or controlling of the thickening process based on the measured interface heights $h_m$ and/or the calculated interface heights $h_c$. As an example monitoring, regulation and/or controlling can e.g. be performed based on the average of the measured and the calculated interface heights $h_m$, $h_c$.

Regulation and/or control of the thickening process preferably comprises regulating and/or controlling the interface height h based on the measured and/or the calculated interface heights $h_m$, $h_c$. This method step can e.g. be performed manually or in a semi or fully automated way, e.g. by the super-ordinated unit 33, by regulating and/or controlling the flow of the medium supplied the container 7, the flow of the liquid withdrawn from the container 7 through the overflow outlet 13, the flow of the sediment discharged from the container 7 through the underflow outlet 15, and/or by regulating and/or controlling the supply of the product based on the measured and/or the calculated interface heights $h_m$, $h_c$. Each of these flows as well as each of the supplies can e.g. be adjusted accordingly by means of the valves V1, V,2, V3, V4 foreseen in the supply pipe 11, the overflow outlet pipe 17, the underflow outlet pipe 19 and the supply line 27.

As an additional option simultaneously obtained measured and calculated interface heights $h_c$, $h_m$ are preferably applied to monitor the interface level measurement device L and the calculation unit 35. This method step is preferably performed by the super-ordinated unit 33 and/or by the calculation unit 35. Further a fault is preferably detected when a deviation between the measured interface height $h_m$ and the corresponding calculated interface height $h_c$ exceeds a predetermined threshold. When a fault is detected, a notification informing about this fault is preferably provided.

As another option, at least one of the calculated interface heights $h_c$ is preferably applied as a reference height $h_{ref}$ for the interface height measurements performed by the interface level measurement device L. In this case, a limited measurement range LR for the interface level measurement device L comprising the respective reference height $h_{ref}$ is determined based on the respective reference height $h_{ref}$ and the interface level measurement device L performs a measurement of the interface height h within this limited measurement range LR. To this extent, the calculated interface height $h_c$ or the corresponding limited measurement range LR can e.g. be provided to the interface level measurement device L via the super-ordinated unit 33, the edge device 37 or directly. The interface level measurement device L will then either determine and apply the limited measurement range LR or apply the limited measurement range LR provided to it during the next measurement of the interface height h. Whereas a full measurement range FR of the interface level measurement device L ranging from a minimum height $h_{min}$ to a maximum height $h_{max}$ of the interface 1 is required to be large enough to cover all interface heights h that may occur during normal performance of the thickening process, the limited measurement range LR is preferably determined to be significantly narrower. Thus, the limited measurement range LR only comprises a fraction of the full measurement range FR. As an example the limited measurement range LR can e.g. be determined as a range comprising all interface heights h that deviate from the reference height $h_{ref}$ by less than a predetermined percentage X, e.g. a percentage X of less than 10%, preferably of less than 5% of the width of the full measurement range FR, e.g. by $LR:=h_{ref}+/-X \% (h_{max}-h_{min})$.

Figure 3:
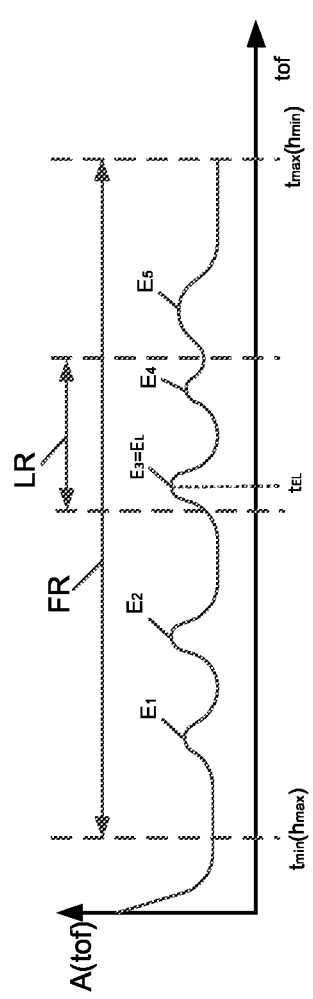
FIG. 3 shows an echo function determined by a time of flight interface level measurement device during difficult measurement conditions.

Limiting the measurement range to the limited measurement range LR determined based on the reference height $h_{ref}$ helps to improve the measurement capability, the measurement accuracy, as well as the measurement reliability of the interface level measurement device L. As an example, under unfavorable measurement conditions, an echo function A(tof) determined by a time of flight level measurement device as described above may comprise a large number of overlapping, partially overlapping and/or non-overlapping amplitude peaks $E_i$. For illustration purposes, FIG. 3 shows very simplified example of such an echo function A(tof) comprising a comparatively small number of amplitude peaks $E_1, \ldots, E_5$. The amplitude peaks $E_1, \ldots, E_5$ comprised in the echo function A(tof) are caused by reflections on various reflectors distributed along the signal transmission path. Due to the multitude of reflections it may be very difficult or even impossible to determine the maximum $E_L$ of the echo function A(tof) corresponding to the reflection at the interface 1, when the full measurement range FR is applied. The full measurement range FR is indicated in FIG. 3 by a double pointed arrow extending from the minimum time of flight $t_{min}$ corresponding to the maximum height $h_{max}$ comprised in the full measurement range FR to the maximum time of flight $t_{max}$ corresponding to the minimum height $h_{min}$ comprised in the full measurement range FR. By limiting the range to the limited measurement range LR this situation is significantly improved, because all amplitude peaks $E_1, E_2, E_5$ occurring outside the limited measurement range LR can be excluded. As an option, the maximum $E_L$ corresponding to the reflection at the interface 1 can then e.g. be determined as the maximum of the first amplitude peak $E_3$ or the amplitude peak $E_3$ having the highest peak amplitude within the limited measurement range LR. Thus, in the example shown in FIG. 3 the maximum of amplitude peak $E_3$ will be identified as the maximum $E_L$ caused by the reflection at the interface 1. In addition or alternatively, other methods suitable for identifying the maximum $E_L$ corresponding to the reflection at the interface 1 can be applied within the limited measurement range LR. Further limiting the range to the limited measurement range LR also allows for the signal-to-noise ratio as well as the amplitude resolution to be improved.

Even though the measurements of the process variables $v_1, \ldots, v_n$ performed by the group of measurement devices can be expected to be extremely reliable in comparison the measured interface heights $h_m$, there is a possibility that this may change, e.g. due to an unexpected failure of one of the measurement devices. Thus, as an additional option, the method according to the intention may be further improved by at least once calculating and providing a calculated value $v_{oi}$ of at least one of the process variables $v_i$. Based on these calculated values $v_{ci}$ a problem regarding the measurement device measuring the respective process variable $v_i$ is detected and indicated, e.g. by issuing a corresponding notification, when a deviation between the measured process variable $v_i$ and the corresponding calculated value $v_{ci}$ exceeds a predetermined threshold, e.g. a threshold determined based on the uncertainty inherent to the calculation.

As an example, the calculated values $v_{ci}$ can e.g. be determined based on a physical model and/or a statistical model for estimating the respective process variables $v_i$ based on some or all of the other measured process variables $v_1, \ldots, v_n$ or based on the measured interface height $h_m$ and some or all of the other measured process variables $v_1, \ldots, v_n$. These models are preferably determined in the same way as described above, with respect to the modules for estimating the interface height h, e.g. based on some or all of the training data.

As an additional or alternative option, the calculation unit 35 is designed to learn the calculation of calculated values $v_{ci}$ of the respective process variable $v_i$, wherein each calculated value $v_{ci}$ is calculated based on some or all of the other measured process variables $v_1, \ldots, v_n$ or based on the measured interface heights $h_m$ and some or all of the other measured process variables $v_1, \ldots, v_n$ provided to the calculation unit 35. In analogy to the learning process regarding the calculation of the calculated interface heights $h_c$ this learning process is performed based on all measured process variables $v_1, \ldots, v_n$ or based on all measured process variables $v_1, \ldots, v_n$ and the measured interface heights $h_m$ provided. This learning process can be performed in the same way as described above with respect to the learning of the calculation of the calculated interface heights $h_c$. Also, some or all of the same training data can be used.

1 Interface
3 Upper layer
5 Lower layer
7 Container
9 Thickener
11 Supply pipe
13 Overflow outlet
15 Underflow outlet
17 Overflow outlet pipe
19 Underflow outlet pipe
21 Pump
23 Rake
25 Reservoir
27 Supply line
29 Transducer
31 Motor
33 Super-ordinated unit
35 Calculating unit
37 Edge device

The invention claimed is:

1. A method of performing a thickening process with a thickener, wherein said thickener is configured to perform a thickening process with a thickener including a container, wherein particles suspended in a medium supplied to said container are separated from a liquid comprised in the medium, and wherein said upper layer comprises said liquid floating on said lower layer comprising said particles and an interface height of an interface is defined between said upper layer and said lower layer, said method comprising the method steps of:

measuring said interface height with an interface level measurement device installed on said thickener, during time periods, when conditions prevailing at said thickener permit performance of the measurements, with a group of measurement devices installed on said thickener measuring process variables related to the thickening process performed by the thickener, and at least once calculating and providing a calculated interface height with a calculating unit based on said measured process variables provided to said calculating unit, and during a time when measured interface heights are unavailable or unreliable, and wherein said calculating unit is designed to learn said calculation of said calculated interface height based on said measured interface heights and said measured process variables measured during at least one of said time periods and provided by said interface level measurement device and said measurement devices.

2. The method according to claim 1, wherein:

said learning of said at least one calculation of said calculated interface height is performed by said calculation unit performing a learning process based on training data determined as or based on said measured interface heights and said measured process variables measured and provided by said interface level measurement device and said group of measurement devices, and only measured interface heights and measured process variables measured during one or more time intervals, during which the measured interface heights are reliable are used as training data or to determine said training data.

3. The method according to claim 1, wherein:

reliability or unreliability of said measured interface heights is determined by at least one of:
  monitoring said measured interface heights,
  determining a rate of change of said interface height as a function of time based on said measured interface heights and based on said rate of change,
  determining measured interface heights determined during time intervals during which the rate of change exceeds a predetermined threshold or a threshold given by a maximum speed of the interface height to be expected during performance of the thickening process as being unreliable,
  determining measured interface heights exceeding a predetermined height range or a height range given by a range of interface heights to be expected during normal performance of the thickening process as being unreliable,
  monitoring a signal to noise ratio of a measurement signal obtained by said interface level measurement device and identifying measured interface heights determined based on measurement signals having a signal to noise ratio smaller than a predetermined threshold as unreliable,
  applying a filter to said measured interface heights, based on said measured interface heights and said filtered interface heights determining a noise superimposed on said filtered interface heights and identifying measured interface heights measured at times when said noise exceeded a predetermined threshold as unreliable,
  performing reference measurements of said interface height and identifying measured interface heights deviating from the corresponding reference measurements by more than a predetermined threshold as unreliable,
  determining at least one of: at least one physical model for estimating said interface height based on at least one of said measured process variables and a statistical model for estimating said interface height based on at least one of said measured process variables, and based on estimated interface heights determined based on at least one of said models performing at least one of:
    identifying measured interface heights deviating from the corresponding estimated interface height by more than a predetermined threshold or a threshold determined based on an uncertainty inherent to the estimation as being unreliable,
    identifying unreliable measured interface heights comprised in training data determined for learning said calculation of said calculated interface heights and eliminating said identified unreliable measured interface heights from said training data,
    providing a notification informing about unreliable measured interface heights identified based on said estimated interface heights, and
  performing at least one other method capable of determining the reliability or the unreliability of the measured interface heights.

4. The method according to claim 1, comprising at least one of the method steps of:

determining training data for learning said calculation of said calculated interface heights by additionally performing an outlier detection or an outlier detection implemented as part of a machine learning process, based on this outlier detection identifying outliers comprised in said training data and eliminating said identified outliers from said training data applied to learn said calculation, and based on at least one of said measured process variables or based on said measured interface heights and at least one or all of said measured process variables numerically determining values of at least one of said process variables, wherein: said numerically determined values comprise at least one of: at least one numerically determined value determined by interpolation, at least one numerically determined value determined by simulation and at least one numerically determined value determined by a Monte Carlo simulation, and performing at least one of:

applying numerically determined values determined for times comprised in at least one of said time periods or time intervals during which said measured interface heights and said measured process variables applied to determine training data for learning said calculation of said calculated interface heights were measured as additional training data, and applying numerically determined values determined for times occurring after the learning of said calculation of said calculated interface heights has been completed in addition to said measured process variables to calculate said calculated interface heights.

5. The method according to claim 1, comprising the method steps of:

determining at least one secondary variable, or at least one secondary variable directly or indirectly related to said interface height as a function of at least one of: said measured interface height and at least one or all of said measured process variables, and performing at least one of:

using said secondary variables determined for times comprised in at least one of said time periods or time intervals during which said measured interface heights and said measured process variables applied to determine training data for learning said calculation of said calculated interface heights were measured as additional training data, and applying said secondary variables determined for times occurring after said learning of said calculation of said calculated interface heights has been completed in addition to said measured process variables to calculate said calculated interface heights.

6. The method according to claim 1, comprising the method steps of for at least one of said process variables performing at least one of the method steps of:
- at least once calculating and providing a calculated value of said process variable, and
- detecting and indicating a problem regarding the measurement device measuring said process variable when a deviation between said measured process variable measured by said measurement device and the corresponding calculated value exceeds a predetermined threshold or a threshold determined based on an uncertainty inherent to said calculation,
wherein said calculated values of said process variables comprise at least one of
- at least one calculated value determined based on a physical model or a statistical model for estimating the respective process variable based on some or all of the other process variables measured by said measurement devices or based on the measured interface height and some or all of the other process variables measured by said measurement devices, and
- at least one calculated value calculated by said calculation unit, wherein:
said calculation unit is designed to learn said calculation of calculated values of said process variable based on said measured process variables or based on said measured process variables and said measured interface heights, and
each of said calculated values of the respective process variable is calculated based on some or all of the other process variables measured and provided by said measurement devices or based on the measured interface heights and on some or all of the other process variables measured and provided by said measurement devices.

7. The method according to claim 1, wherein at least one of: said measured interface heights, at least one of said measured process variables and some or all of said training data is provided to said calculation unit by at least one of:
- said interface level measurement device and at least one of said measurement devices comprised in said group;
- a super-ordinated unit connected to and/or communicating with at least one or all of: said interface level measurement device and at least one of said measurement devices comprised in said group, and
- an edge device connected to and/or communicating with at least one or all of: said interface level measurement device and at least one of said measurement devices comprised in said group.

8. The method according to claim 1, wherein said process variables and said interface height are correlated.

9. The method according to claim 1, wherein said group of measurement devices measuring and providing said process variables comprise at least one of:
- a flow meter installed in or on a supply pipe supplying said medium to said container, said flow meter measuring a flow of said medium supplied to said container,
- a flow meter installed in or on an overflow outlet pipe and measuring a flow of said liquid withdrawn from said container through said overflow outlet pipe,
- a flow meter installed in or on an underflow outlet pipe connected to an underflow outlet located at or near a bottom of the container, said flow meter measuring a flow of a sediment discharged from said container through said underflow outlet pipe, and
- a flow meter installed in or on a supply line supplying a product, namely a product comprising at least one of: a flocculant and a coagulant, supplied to said container, said flow meter measuring a flow of the product supplied to said container through said supply line,
- a density measurement device measuring a density of a sediment located at or near a bottom of the container,
- a density measurement device installed in or on said underflow outlet pipe and measuring a density of said sediment discharged from said container through said underflow outlet pipe,
- a pressure measurement device measuring a hydrostatic pressure prevailing at a predetermined height inside said container or at or near said bottom of said container,
- a torque measurement device measuring a torque exerted by a motor to rotate a rake installed on said thickener around a longitudinal axis of rotation, wherein said rake is a rake for pushing said sediment towards an underflow outlet located at a bottom of said container,
- a height measurement device measuring an insertion height of said rake in relation to a predetermined reference height,
- a turbidity measurement device installed in or on said overflow outlet pipe measuring a turbidity of said liquid withdrawn from said container through said overflow outlet pipe, and
- at least one other measurement device measuring at least one other process variable.

10. The method according to claim 1, further comprising performing a least one of: providing said calculated interface heights and performing at least one of: monitoring, regulating and controlling said thickening process performed on said thickener based on said calculated interface heights.

11. The method according to claim 1, further comprising the method steps of: during at least one or all of said time periods, during which said measurements of said interface height are permitted and performed by said interface level measurement device:
- determining said calculated interface heights, and
- performing at least one of: providing said calculated interface heights and performing at least one of: monitoring, regulating and controlling said thickening process performed on said thickener based on at least one of: said measured interface heights, said calculated interface heights and an average of said measured and said calculated interface heights.

12. The method according to claim 1, further comprising the method steps of: during at least one or all of said time periods, during which said measurements of said interface height are permitted and performed by said interface level measurement device, determining said calculated interface heights and performing at least one of:
- monitoring said interface level measurement device and said calculation unit based on said measured and said calculated interface heights,
- detecting a fault when a deviation between one of said measured interface heights and the corresponding calculated interface height exceeds a predetermined threshold, and
- when a fault is detected providing a notification informing about this fault.

13. The method according to claim 1, further comprising the method steps of at least once:
provide one of said calculated interface heights as a reference height for an interface height measurement,
based on said reference height determining a limited measurement range comprising said reference height for said interface level measurement device, and
performing a measurement of said interface height with said interface level measurement device within this limited measurement range,
wherein said limited height range is determined as a fraction of a full measurement range of said interface level measurement device or is determined as a range comprising interface heights deviating from said the reference height by less than a predetermined percentage, by less than 10% of a width of said full measurement range.

14. The method according to claim 13,
wherein said interface level measurement device:
is a time of flight measurement device determining said measured interface heights based on a time of flight required for a signal to travel to said interface and for its reflection to return, and
comprises a signal processing and evaluation unit determining an echo function representing a signal amplitude of the echo signal as a function of the time of flight, identifying a maximum of said echo function caused by said reflection at said interface and determining the measured interface height based on the time of flight at which this maximum occurs, and
wherein said measurement of said interface height performed within said limited measurement range is performed by at least one of:
excluding all amplitude peaks comprised in said echo function occurring outside said limited measurement range,
determining said maximum corresponding to said reflection at said interface as a maximum of a first amplitude peak or an amplitude peak having the highest peak amplitude comprised in said echo function within said limited measurement range, and
performing a method of identifying said maximum of said echo function caused by said reflection at said interface within said limited measurement range.

15. A computer program product comprising at least one tangible computer readable medium, and stored upon said at least one tangible computer readable medium a computer program comprising instructions which, when the computer program is executed by a computer, cause the computer to carry out the method according to claim 1.

16. The computer program product according to claim 15, wherein said instructions comprise instructions which, when the program is executed by a computer, cause said computer to perform said learning of said calculation based on said measured interface heights and said measured process variables and to perform said calculation of said at least one calculated interface height based on said learned calculation and said measured process variables.

* * * * *